United States Patent
Holz

[19]

[11] Patent Number: 6,056,497
[45] Date of Patent: May 2, 2000

[54] UNLOADING METHOD AND DUMP WAGON FOR POTTED PLANTS

[75] Inventor: Kenneth Holz, Hastings, Minn.

[73] Assignee: Bailey Nurseries, Inc., St. Paul, Minn.

[21] Appl. No.: 09/365,719

[22] Filed: Aug. 3, 1999

[51] Int. Cl.[7] ................................................ B60P 1/04
[52] U.S. Cl. ........................................... 414/492; 414/514
[58] Field of Search ................................... 414/491, 492, 414/493, 514, 515

[56] References Cited

U.S. PATENT DOCUMENTS

| | | |
|---|---|---|
| 862,597 | 8/1907 | Wilson . |
| 2,675,934 | 4/1954 | Kennedy . |
| 2,748,965 | 6/1956 | Grey . |
| 3,003,780 | 10/1961 | Lundahl . |
| 3,110,406 | 11/1963 | Roth ................................... 414/492 X |
| 3,366,257 | 1/1968 | Strom ................................. 414/492 X |
| 3,572,563 | 3/1971 | Oliver . |
| 3,834,753 | 9/1974 | Heiter ........................................ 296/10 |
| 4,372,725 | 2/1983 | Moore et al. ............................ 414/460 |
| 4,632,626 | 12/1986 | O'Shea . |
| 5,700,124 | 12/1997 | Dufraisse . |
| 5,795,124 | 8/1998 | Kitten et al. . |

Primary Examiner—Steven A. Bratlie
Attorney, Agent, or Firm—James W. Miller

[57] ABSTRACT

A dump wagon for transporting potted plants from one location to another and for unloading the potted plants. The dump wagon includes a wagon bed that tilts between a horizontal transport position and a tilted or inclined unloading position. A pusher at one end of the wagon bed is movable towards the other end of the wagon bed to push potted plants off the wagon as the wagon is slowly moved forwardly. The pusher is chain driven and automatically disengages the chains when the pusher reaches the other end of the wagon bed and the unloading operation is complete. Side rails prevent the potted plants from falling off the sides of the wagon, the side rails being movable out of the way for the purpose of loading the dump wagon.

20 Claims, 3 Drawing Sheets

6,056,497

UNLOADING METHOD AND DUMP WAGON FOR POTTED PLANTS

TECHNICAL FIELD

This invention relates to a method for transporting and unloading a group of potted plants. This invention also relates to a dump wagon for use in this method or for unloading other items or objects.

BACKGROUND OF THE INVENTION

Wholesale plant nurseries, such as Bailey Nurseries, the assignee of this invention, grow large numbers of potted plants for distribution to various retail greenhouses. It is often necessary to move groups of potted plants from one location to another within the nursery. The number of plants to be moved is often quite large. For example, many hundreds of potted plants might have to be periodically moved within the nursery for various reasons.

Nurseries often load groups of potted plants that need to be moved onto transport wagons. For example, one wagon might hold a group of from thirty to a couple hundred potted plants, the group of plants usually substantially covering the wagon bed. The wagon is then driven to a desired location within the nursery where the plants are to be unloaded. The plants are taken off the wagon and then placed on the ground in the same group they were in while on the wagon. This group of plants might then be left at this location for some time while the plants mature or await shipment.

In some cases, it is possible to load the wagon at a central location where semi-automated plant handling equipment is available. For example, the plants can be delivered by conveyors to workers who stand adjacent the wagon. These workers simply take the plants as they are delivered by the conveyor and slide them onto the wagon bed. This loading can be done relatively quickly and easily.

However, unloading the plants from the wagons after the wagon has been moved into the nursery to some desired drop off location is a different and more difficult task. The drop off location might be anywhere within the nursery. Since the nursery covers many acres, it is not cost effective to have centralized unloading equipment at locations spread throughout the nursery. Accordingly, the potted plants have traditionally been unloaded from the wagon by hand.

Manual unloading of the wagon is strenuous, time-consuming work. It often takes a half hour or forty five minutes for one or two workers to pick up the potted plants from the wagon and place them into a group on the ground. Accordingly, there is a need in the art for an easier and faster way of unloading potted plants from a transport wagon.

SUMMARY OF THE INVENTION

One aspect of this invention relates to a method of transporting and unloading potted plants. The method comprises providing a plurality of potted plants, loading the potted plants on a bed of a movable dump wagon, transporting the potted plants to a desired drop-off location using the dump wagon, tilting the wagon bed until one end of the wagon bed is generally adjacent the ground and pushing the potted plants off the one end of the wagon bed as the wagon is moved forwardly to allow the potted plants on the wagon bed to be pushed off as a group onto the ground.

Another aspect of this invention comprises a dump wagon for unloading items carried on the wagon. The dump wagon comprises a movable frame. A bed is pivotally mounted on the frame for allowing the bed to pivot between a horizontal transport position and a tilted unloading position. A pusher is adjacent one end of the wagon bed, the pusher being movable towards the other end of the wagon bed to push items carried on the wagon bed off the other end of the wagon bed. At least one longitudinal side rail is carried on either side of the wagon bed extending above the wagon bed into an interfering position with the items carried on the wagon bed for preventing the items from sliding off opposite sides of the wagon bed. At least one side rail can be removed from its interfering position to allow items to be loaded on the wagon bed from that side of the wagon from which the side rail has been removed.

Yet another aspect of this invention comprises a dump wagon for unloading items carried on the wagon. The dump wagon comprises a movable frame. A wagon bed is pivotally mounted on the frame for allowing the bed to pivot between a horizontal transport position and a tilted unloading position. A pusher is adjacent one end of the wagon bed, the pusher being movable towards the other end of the wagon bed to push the items carried on the wagon bed off the other end of the wagon bed. At least one chain is provided to which the pusher is attached for moving the pusher from one end of the wagon to the other end, the pusher being disengagable from the chain.

Another aspect of this invention comprises a dump wagon for unloading items carried on the wagon. The dump wagon comprises a movable frame. A wagon bed is pivotally mounted on the frame for allowing the bed to pivot between a horizontal transport position and a tilted unloading position. A pusher is adjacent one end of the wagon bed, the pusher being movable towards the other end of the wagon bed to push the items carried on the wagon bed off the other end of the wagon bed. A plurality of guides extend over at least a portion of the wagon bed and are parallel to one another, the guides keeping the items on the wagon bed in aligned longitudinal rows.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
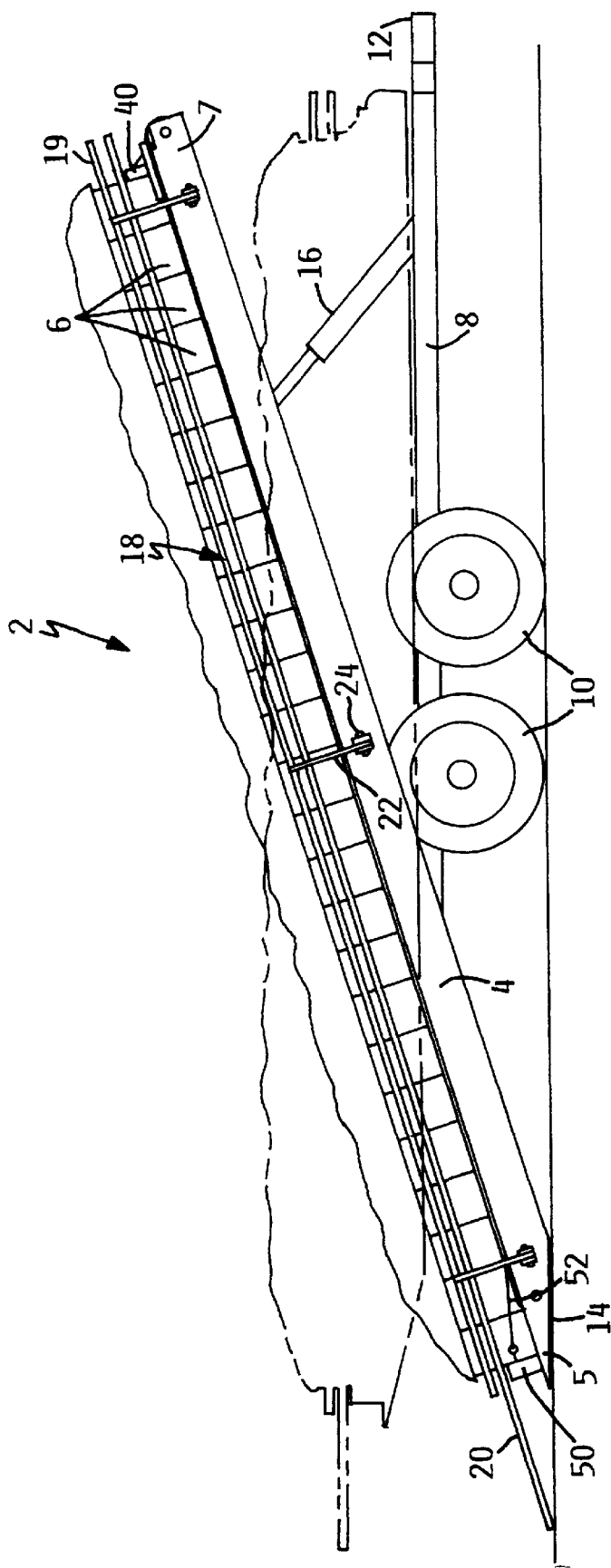
FIG. 1 is a side elevational view of a dump wagon according to this invention for use in transporting and unloading potted plants and the like, the dump wagon shown in phantom in its transport position and in solid in its tilted, unloading position prior to any plants having been unloaded therefrom.
Figure 2:
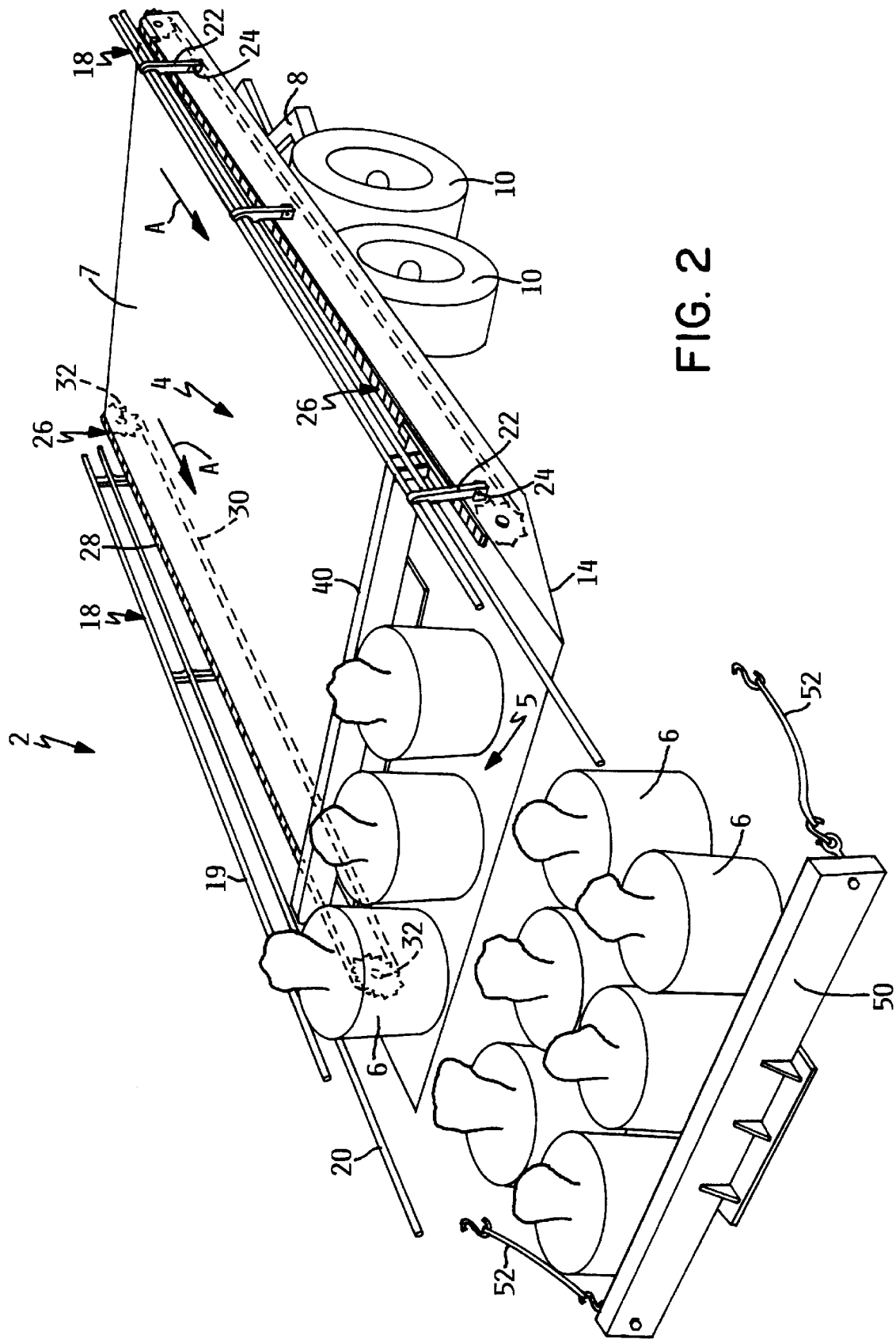
FIG. 2 is a perspective view of the dump wagon according to this invention, the dump wagon shown in its tilted, unloading position during a plant unloading operation.
Figure 3:
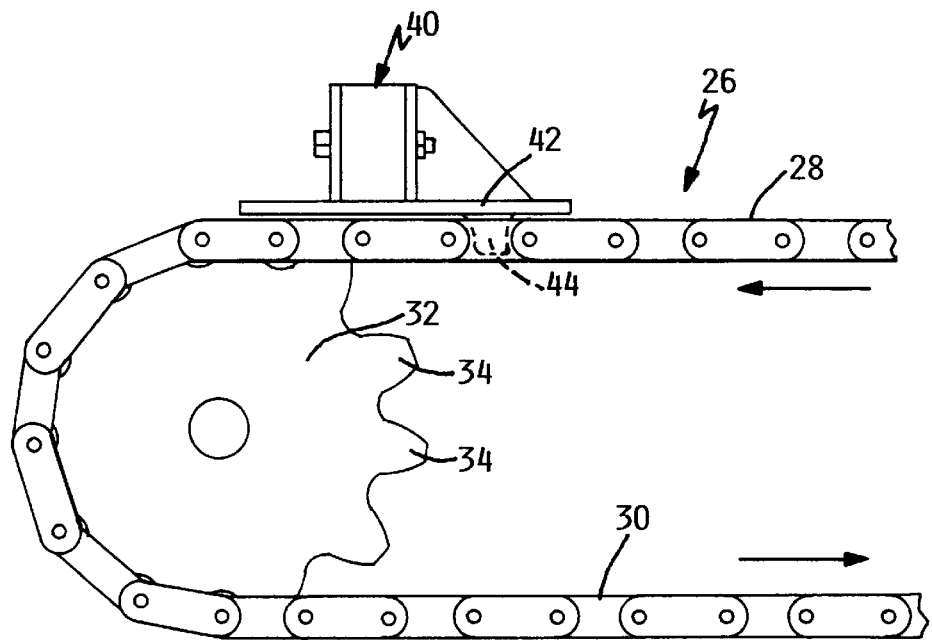
FIG. 3 is an enlarged side elevational view of a portion of the dump wagon shown in FIG. 1, particularly illustrating the unloading pusher and its connection to one of the chains which moves the pusher in an unloading operation.

Referring first to FIGS. 1 and 2, a dump wagon according to this invention is generally illustrated as 2. Dump wagon 2 includes a generally rectangular wagon bed 4 comprising a flat, planar support surface on which a group of potted plants 6 may be loaded. Wagon bed 4 is large enough, e.g. approximately 16' long by 8' wide or so, to hold anywhere from approximately thirty to a couple hundred potted plants 6 depending on the size of the pots carrying plants 6. When dump wagon 2 is fully loaded, potted plants 6 substantially completely cover the surface of wagon bed 4.

Dump wagon 2 has a frame 8 that includes a plurality of ground supporting wheels 10. Wheels 10 allow dump wagon 2 to move over the ground. Frame 8 preferably comprises a tow frame having one end 12 that can be hitched to a tractor (not shown) such that dump wagon 2 comprises a trailer. Alternatively, dump wagon 2 could be part of a self propelled vehicle rather than being a towed implement.

Wagon bed 4 is pivotally mounted on frame 8 such that it can be tilted between one of two positions. The first position is a generally horizontal transport position shown in phantom lines in FIG. 1. Wagon bed 4 can be loaded with plants 6 and then can be moved to transport plants 6 when wagon bed 4 is in its transport position.

The second position of wagon bed 4 is a tilted unloading position. In this position, wagon bed 4 is inclined to bring the rear end 5 of wagon bed 4 into engagement with the ground. Rear end 5 of wagon bed 4 has a tapered lower face 14 such that the lower face of rear end 5 of wagon bed 4 lies generally flush against the ground when wagon bed 4 has been placed into its tilted unloading position. The tilted unloading position of wagon bed 4 is shown in solid lines in FIG. 1.

Any suitable pivot structure can be used for pivotally supporting wagon bed 4 on frame 8. In addition, any suitable means for tilting wagon bed 4 into its unloading position can be used. One preferred tilting means is a hydraulic cylinder 16 extending between frame 8 and the bottom of wagon bed 4. Hydraulic cylinder 16 can be selectively operated by the operator using a control carried on the tractor. When this control is operated, pressurized fluid provided by a fluid source on the tractor is applied to hydraulic cylinder 16 to cause the ram of cylinder 16 to extend. Extension of the ram of cylinder 16 pivots wagon bed 4 about its pivot axis until rear end 5 is placed against or closely adjacent to the ground.

A side rail 18 is attached to each longitudinal side of wagon bed 4 to extend along the length of wagon bed 4. Each side rail 18 comprises dual upper and lower rail members 19 and 20 that are fixed together as a unit with the lower rail member 20 being longer than the upper rail member 19. When wagon bed 4 is in its tilted unloading position, the lower rail member extends to a point which is closely adjacent the ground as shown in FIG. 1. While two conjoined rail members 19 and 20 have been shown as comprising each side rail 18, each side rail 18 could comprise only one rail member if so desired.

Each side rail 18 is pivotally attached to the outside of wagon bed 4 by pivot arms 22 and pivots 24. Any suitable means for locking each side rail 18 in an upright position could be used. As shown in FIGS. 1 and 2, side rails 18 are normally disposed in an upright, locked orientation located above wagon bed 4. In this orientation, side rails 18 are in an interfering, abutting relationship to plants 6 and prevent plants 6 from sliding off the sides of wagon 2.

At least one side rail 18, and preferably both side rails 18, can be pivoted until side rail 18 hangs downwardly from pivots 24 and is out of the way of wagon bed 4. A worker can then stand on that side of dump wagon 2 on which side rail 18 has been swung down. This worker can more easily load wagon bed 4 by sliding potted plants 6 across the surface of wagon bed 4 and up against the other side rail 18, which is still upright and in place, or up against other plants 6 already present on wagon bed 4. After wagon bed 4 is loaded, that side rail 18 which hangs down will then be swung up about pivots 24 and locked in its upright position. Thus, during transport and unloading, each side rail 18 will normally be upright and locked to laterally confine potted plants 6 to the surface of wagon bed 4.

An endless chain 26 is carried on each side of wagon bed 4 adjacent one of the sides of wagon bed 4. The upper run 28 of each chain 26 rides along on top of the surface of wagon bed 4 to be exposed from above. The lower run 30 of each chain 26 is supported beneath the surface of wagon bed 4.

Chains 26 are rotatably journalled adjacent each end of wagon bed 4 by sprockets 32. Each sprocket 32 has a plurality of teeth 34 which engage in a link of chain 26 to drive chain 26. Most of sprocket 32 is also located beneath the surface of wagon bed 4. However, sprocket teeth 34 also come up through the surface of wagon bed 4 in order to engage upper run 28 of chain 26.

Chains 26 can be simultaneously driven in any suitable manner. One preferred manner of driving chains 26 is by a hydraulic motor or motors (not shown) which is drivingly coupled to the shafts of at least some of the sprockets 32. Again, the operator, using a control carried on the tractor, selectively applies pressurized fluid from a fluid source on the tractor to the hydraulic motor or motors to cause sprockets 32 to rotate and drive chains 26 in a direction from a front end 7 to rear end 5 of dump wagon 2, i.e. in the direction indicated by the arrows A in FIG. 2. Any other suitable, selectively operable means of driving chains 26, e.g. an electric motor system, could be used in place of a hydraulic drive system.

A pusher 40 can be coupled to chains 26 for movement therewith. Pusher 40 comprises an elongated board which extends across the width of wagon bed 4 and is received between opposed side rails 18. Pusher 40 is connected at each side to an elongated plate 42 having a downwardly depending lug 44. Lug 44 is shaped to fit within a link on chain 26 such that movement of chains 26 will also move pusher 40 over the surface of wagon bed 4. However, when pusher 40 approaches and contacts sprocket 32 on rear end 5 of wagon bed 4, teeth 34 on sprocket 32 will cam lugs 44 on pusher 40 up and out of chain 26 to automatically disconnect pusher 40 from chain 26.

When wagon bed 4 is initially loaded, pusher 40 is positioned at front end 7 of dump wagon 2 as shown in FIG. 2. This is its normal position when dump wagon 2 is being loaded and during transport. In this position, pusher 40 functions as a front stop and prevents potted plants 6 from sliding longitudinally off front end 7 of dump wagon 2.

Pusher 40 moves, under the selective control of the operator, only when dump wagon 2 is being unloaded. This movement in the direction of the arrows A in FIG. 2 helps unload potted plants 6 from dump wagon 2 as will be described in more detail hereafter.

A rear stop 50 is also preferably included to help prevent potted plants 6 from longitudinally sliding off rear end 5 of dump wagon 2 during transport of plants 6. This rear stop 50 comprises an elongated board of a similar size and shape to that of pusher 40 extending across the width of wagon bed 4. Unlike pusher 40, rear stop 50 does not engage chains 26. Instead, rear stop 50 has ropes, straps or bungle cords 52 or the like for releasably securing rear stop 50 to side rails 18 of dump wagon 2 as shown in FIG. 2.

Considering now the operation of dump wagon 2 of this invention, dump wagon 2 is loaded with plants while wagon bed 4 is horizontal. When dump wagon 2 is equipped with pivotal side rails 18, one such side rail 18 can be swung down to allow wagon bed 4 to be loaded with plants by sliding plants 6 onto wagon bed 4 from the side with the unlatched side rail 18. This loading operation is done with pusher 40 in place such that pusher 40 also forms a front stop against which plants 6 can be loaded. After the surface of wagon bed 4 is more or less completely loaded with plants 6, rear stop 50 can be installed by laying rear stop 50 on wagon bed 4 in engagement with plants 6 and by hooking bungee cords 52 on rear stop 50 around side rails 18. If a side rail 18 has been swung down to load dump wagon 2, this side rail 18 is first swung up and locked in place before bungee cords 52 are hooked to the side rail 18. In any event, when dump wagon 2 is loaded, both pusher 40 and rear stop 50 will be in place and both side rails 18 will be up and locked. See FIG. 2.

After dump wagon 2 has been loaded, it can then be moved while still in its horizontal transport position to a desired location where plants 6 are to be unloaded onto the ground. This is done by pulling dump wagon 2 behind a tractor or the like or by driving dump wagon 2 to such location if dump wagon 2 is part of a self-propelled vehicle. When the desired drop off location is reached, the operator can then easily and quickly unload potted plants 6.

To unload potted plants 6 from dump wagon 2, the operator tilts dump wagon 2 to its tilted unloading position by extending the ram of hydraulic cylinder 16 using controls and fluid pressure provided on the tractor. The tilting proceeds until the tapered lower face 14 of rear end 5 of wagon bed 4 lies generally flat against the ground. The operator then unhooks rear stop 50 by unhooking bungee cords 52 from side rails 18. However, rear stop 50 is preferably left in place on wagon bed 4 against the group of potted plants 6 after it is unhooked.

With wagon bed 4 in its tilted unloading position and with rear stop 50 unhooked, the operator can then activate the hydraulic drive to chains 26 while slowly driving the tractor forwardly at about the same speed as chains 26 are driven rearwardly. When this is done, pusher 40 will move from its usual position at front 7 of wagon bed 4 towards rear end 5 of wagon bed 4, pushing potted plants 6 off wagon bed 4 as it goes. Because the tractor is also pulling dump wagon 2 forwardly, potted plants 6 will smoothly slide off wagon bed 4 onto the ground in the same rectangular group in which they were disposed while on dump wagon 2. The whole unloading operation takes only a few seconds. The combination of the rearward motion of pusher 40 and the forward motion of dump wagon 2 unloads wagon bed 4 very quickly and easily.

FIG. 2 shows an unloading operation as the unloading operation is nearing an end. Note rear stop 50 gets pushed off wagon bed 4 first and will then simply lie on the ground. Potted plants 6 will slide off in their various longitudinal and transverse rows until all such plants 6 are lying upright in a rectangular group on the ground. The operator can keep pusher 40 moving until all plants 6 are off at which point he can manually stop pusher 40. If the operator neglects to manually stop pusher 40, pusher 40 will automatically disengage chains 26 when lugs 44 on pusher 40 reach sprockets 32 at rear end 5 of dump wagon 2. In either case, whether the operator stops pusher 40 or pusher 40 disengages itself, once the unloading is completed, the operator can then pick pusher 40 up and manually carry pusher 40 back to front end 7 of dump wagon 2 to reset pusher 40 for the next loading and unloading cycle.

The method of unloading potted plants according to this invention, i.e. by loading plants 6 on dump wagon 2 of this invention and by then unloading plants 6 by tilting dump wagon 2 and pushing plants 6 off while moving dump wagon 2 forwardly, saves much time and labor. One operator can unload a fully loaded dump wagon 2 in a matter of seconds as opposed to the half hour or forty five minutes of labor that was previously required. The time and labor savings afforded by this invention are thus apparent.

Figure 4:
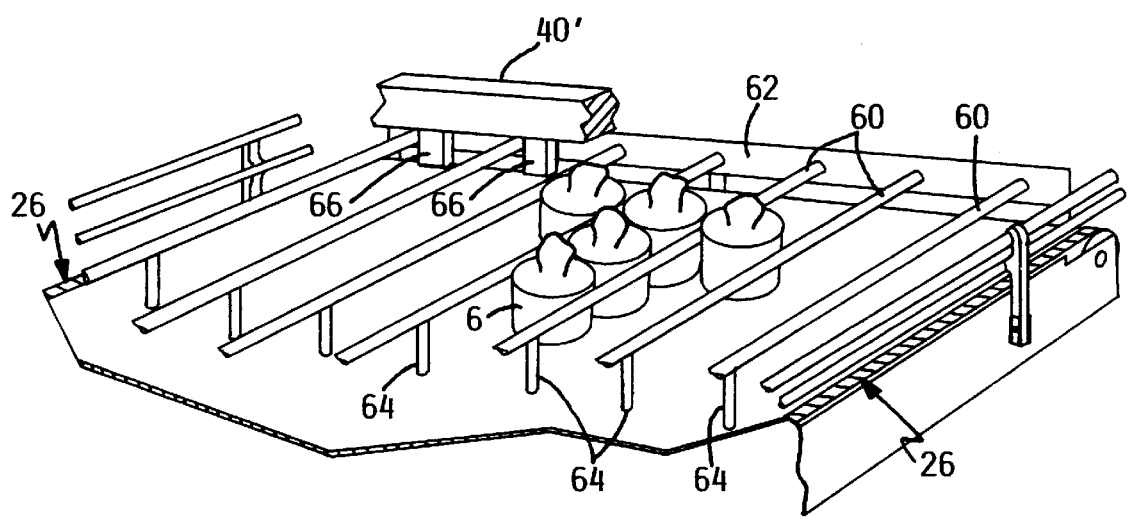
FIG. 4 is a partial perspective view of one end of the dump wagon shown in FIG. 1, particularly illustrating an alternative embodiment of the dump wagon using row aligning guides on the dump wagon for maintaining the potted plants in rows.

In using dump wagon 2 of this invention, potted plants 6 occasionally become slightly misaligned when they slide off wagon bed 4, i.e. any given longitudinal row of plants might be slightly crooked. FIG. 4 shows an alternative version of dump wagon 2 to prevent this from happening.

In FIG. 4, a plurality of longitudinal guides 60 are added to wagon bed 4 to keep plants 6 in precisely aligned longitudinal rows. A longitudinal row is one which runs the length of wagon bed 4 rather than the width of wagon bed 4. Guides 60 can be secured at one end to a support 62 at front end 7 of dump wagon 2. Guides 60 can also be supported at spaced locations along their length by upstanding posts 64 extending between wagon bed 4 and the underside of guides 60. Sufficient posts 64 are used to prevent guides 60 from sagging. Guides 60 are long enough to extend over substantially the entire length of dump wagon 2 from front end 7 to rear end 5 of dump wagon 2.

When guides 60 are used, a different pusher 40' must be configured to extend above guides 60 except at each side of pusher 40' where pusher 40' extends down to engage chains 26. Pusher 40' would then include a plurality of downwardly extending pusher fingers 66 with one pusher finger 66 being received between each pair of guides 60. As pusher 40' is driven forwardly by chains 26, each pusher finger 66 will move forwardly between a pair of guides 60 to push the row of potted plants 6 contained between such guides 60 off rear end 5 of wagon bed 4. Only a portion of pusher 40' is shown in FIG. 6.

Keeping plants 6 in precisely aligned longitudinal rows as such plants 6 come off wagon 2 allows the use of other known plant handling equipment to subsequently space the plants in each row from one another. Such known equipment is able to take the plants in a row of plants and space them out further relative to one another. However, this can be done only when the plants are in a relatively precisely aligned row. Thus, using guides 60 to better maintain the longitudinal alignment of plants 6 as they are pushed off wagon bed 4 would allow this known equipment to subsequently space the plants in each row apart from one another without having to manually align the rows. However, the use of guides 60 is optional and not a necessary part of the novel unloading method and dump wagon 2 of this invention.

Various modifications of this invention will be apparent to those skilled in the art. For example, side rails 18 could be fixed in place on wagon bed so as to not be capable of being swung down or otherwise removed from their interfering relationship to sideward movement of plants 6. Such fixed side rails 18 are particularly useful if guides 60 are used on wagon 2 since plants 6 cannot be loaded, in this embodiment, by sliding plants 6 across wagon bed 4 from the side of wagon bed 4. Alternatively, side rails 18 could be movable out of the way of wagon bed 4 in other ways, i.e. by having side rails 18 slide up and down rather than pivot up and down or even by having side rails 18 be completely removable from wagon 2 by lifting side rails 18 up out of upwardly facing sockets. Moreover, pusher 40 or 40' could be manually operated though some type of powered movement of the pusher is preferred. Thus, the scope of this invention is to be limited only by the appended claims.

We claim:

1. A method of transporting and unloading potted plants, which comprises:
   (a) providing a plurality of potted plants;
   (b) loading the potted plants on a bed of a movable dump wagon;
   (c) transporting the potted plants to a desired drop-off location using the dump wagon;
   (d) tilting the wagon bed until one end of the wagon bed is generally adjacent the ground; and
   (e) pushing the potted plants off the one end of the wagon bed as the wagon is moved forwardly to allow the potted plants on the wagon bed to be pushed off as a group onto the ground.

2. The method of claim 1, wherein the pushing step comprises moving a pusher towards the one end of the wagon bed as the wagon is moved forwardly, the pusher abutting against at least some of the potted plants to push the potted plants off the wagon bed.

3. A dump wagon for unloading items carried on the wagon, which comprises:
   (a) a movable frame;
   (b) a bed pivotally mounted on the frame for allowing the bed to pivot between a horizontal transport position and a tilted unloading position;
   (c) a pusher adjacent one end of the wagon bed, the pusher being movable towards the other end of the wagon bed to push items carried on the wagon bed off the other end of the wagon bed; and
   (d) at least one longitudinal side rail on either side of the wagon bed and extending above the wagon bed into an interfering position with the items carried on the wagon bed for preventing the items from sliding off opposite sides of the wagon bed, wherein at least one side rail can be removed from its interfering position to allow items to be loaded on the wagon bed from that side of the wagon from which the side rail has been removed.

4. The dump wagon of claim 3, wherein the at least one side rail is pivotally mounted on the wagon to allow the side rail to be swung between a first position in which the side rail is located above the wagon bed to a second position in which the side rail is below the wagon bed.

5. The dump wagon of claim 3, wherein each side rail can be removed from its interfering position with the wagon bed.

6. The dump wagon of claim 3, further including a removable stop at the other end of the wagon bed for longitudinally restraining the items between the stop and the pusher.

7. The dump wagon of claim 6, wherein the stop is an elongated board having at least one strap or cord for removably holding the board on the other end of the wagon.

8. The dump wagon of claim 3, further including at least one selectively actuable member on the dump wagon for moving the pusher towards the other end of the dump wagon.

9. The dump wagon of claim 8, wherein the at least one selectively actuable member comprises at least one chain extending longitudinally on the wagon bed from the one end to the other end of the wagon bed.

10. The dump wagon of claim 9, wherein the pusher is disengagable from the chain to allow the pusher to be reset at the one end of the wagon bed after the pusher has been moved towards the other end of the wagon bed.

11. The dump wagon of claim 10, wherein the pusher is automatically disengagable from the chain when it reaches the other end of the wagon.

12. The dump wagon of claim 11, wherein the pusher includes a downwardly extending drive lug that can be releasably received within a link of the chain, the chain being journalled at either end by sprockets located at the one end and at the other end of the wagon bed, and the drive lug being cammed up out of the chain by the sprocket at the other end of the wagon bed.

13. The dump wagon of claim 12, further including two chains carried on opposite sides of the wagon bed, the pusher being engageable with both chains.

14. The dump wagon of claim 3, further including a plurality of guides extending over at least a portion of the wagon bed and being parallel to the side rails, the guides being secured to the wagon bed to keep the items in aligned longitudinal rows.

15. The dump wagon of claim 14, wherein the pusher rides on the wagon bed and has a portion which extends above the guides, that portion of the pusher above the guides having a plurality of pusher fingers which extend downwardly between each pair of guides to push the items located between each pair of guides off the wagon bed.

16. The dump wagon of claim 3, wherein the items comprise potted plants.

17. A dump wagon for unloading items carried on the wagon, which comprises:
   (a) a movable frame;
   (b) a wagon bed pivotally mounted on the frame for allowing the bed to pivot between a horizontal transport position and a tilted unloading position;
   (c) a pusher adjacent one end of the wagon bed, the pusher being movable towards the other end of the wagon bed to push the items carried on the wagon bed off the other end of the wagon bed; and
   (d) at least one chain to which the pusher is attached for moving the pusher from one end of the wagon to the other end, the pusher being disengagable from the chain.

18. The dump wagon of claim 17, wherein the pusher is automatically disengagable from the chain when it reaches the other end of the wagon bed.

19. A dump wagon for unloading items carried on the wagon, which comprises:
   (a) a movable frame;
   (b) a wagon bed pivotally mounted on the frame for allowing the bed to pivot between a horizontal transport position and a tilted unloading position;
   (c) a pusher adjacent one end of the wagon bed, the pusher being movable towards the other end of the wagon bed to push the items carried on the wagon bed off the other end of the wagon bed; and
   (d) a plurality of guides extending over at least a portion of the wagon bed and being parallel to one another, the guides keeping the items on the wagon bed in aligned longitudinal rows.

20. The dump wagon of claim 19, wherein the pusher has a plurality of fingers which extend between the guides.

* * * * *